US010193699B2

United States Patent
Yiu et al.

(10) Patent No.: US 10,193,699 B2
(45) Date of Patent: Jan. 29, 2019

(54) PROBABILISTIC CLASSIFIERS FOR CERTIFICATES

(71) Applicant: Microsoft Technology Licensing, LLC, Redmond, WA (US)

(72) Inventors: Kelvin S. Yiu, Seattle, WA (US); Zheng Dong, Bloomington, IN (US); Anthony P. Penta, Bellevue, WA (US); Kevin Kane, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 360 days.

(21) Appl. No.: 14/713,734

(22) Filed: May 15, 2015

(65) Prior Publication Data

US 2016/0337133 A1    Nov. 17, 2016

(51) Int. Cl.
*G06N 7/00* (2006.01)
*H04L 9/32* (2006.01)

(52) U.S. Cl.
CPC .......... *H04L 9/3268* (2013.01); *G06N 7/005* (2013.01); *H04L 2209/64* (2013.01)

(58) Field of Classification Search
CPC .............. H04L 63/0823; H04L 9/3268; H04L 2209/64
USPC ......................................................... 713/156
See application file for complete search history.

(56) References Cited

U.S. PATENT DOCUMENTS

| | | | |
|---|---|---|---|
| 7,739,494 B1 | 6/2010 | McCorkendale et al. | |
| 7,949,771 B1 * | 5/2011 | Chen | H04L 63/166 |
| | | | 709/229 |
| 8,108,477 B2 * | 1/2012 | Oliver | G06F 17/30495 |
| | | | 709/206 |
| 8,667,154 B1 * | 3/2014 | Chen | H04L 63/166 |
| | | | 709/229 |
| 8,732,472 B2 | 5/2014 | Grebennikov et al. | |

(Continued)

FOREIGN PATENT DOCUMENTS

| | | |
|---|---|---|
| WO | WO02075508 | 9/2002 |
| WO | WO03049358 | 6/2003 |

OTHER PUBLICATIONS

Almishari, et al., "Harvesting SSL Certificate Data to Identify Web-Fraud", In Proceedings of Cryptography and Security, Jan. 13, 2014, 13 pages.

Anoosh, Saboori, "A Novel Method in IE11 for Dealing With Fraudulent Digital Certificates", Published on: Feb. 2, 2014, Available at: http://blogs.technet.com/b/pki/archive/2014/02/22/a-novel-method-in-ie11-for-dealing-with-fraudulent-digital-certificates.aspx, 4 pages.

(Continued)

*Primary Examiner* — Dant B Shaifer Harriman
*Assistant Examiner* — Mahabub S Ahmed
(74) *Attorney, Agent, or Firm* — Drinker Biddle & Reath LLP

(57) ABSTRACT

Classifiers may be used to analyze a valid certificate received from an unverified entity in an attempt to establish a secure connection with the unverified entity. The classifiers may determine a probability that the certificate is being used improperly by an unauthorized third party. An action may be taken based on the probability, such as allowing the unverified entity to establish a secure connection, blocking the unverified entity from establishing a secure connection, etc. The classifiers may be trained by employing machine learning techniques on a collection of valid, authorized certificates. Additionally, or alternatively, received certificates may be sampled for further analysis based on the probability and/or predefined sampling percentages.

20 Claims, 5 Drawing Sheets

(56) References Cited

U.S. PATENT DOCUMENTS

| | | | |
|---|---|---|---|
| 8,924,714 B2 | 12/2014 | Hatlelid et al. | |
| 9,407,644 B1* | 8/2016 | Cheng | H04L 63/1408 |
| 2002/0159642 A1* | 10/2002 | Whitney | G06K 9/6228 |
| | | | 382/225 |
| 2005/0080899 A1 | 4/2005 | Vogel et al. | |
| 2008/0052510 A1* | 2/2008 | Kim | H04L 9/3268 |
| | | | 713/158 |
| 2010/0121928 A1* | 5/2010 | Leonard | H04L 63/1433 |
| | | | 709/206 |
| 2010/0131765 A1 | 5/2010 | Bromley et al. | |
| 2013/0117558 A1 | 5/2013 | Metke et al. | |
| 2013/0173914 A1* | 7/2013 | Falk | H04L 9/3268 |
| | | | 713/156 |
| 2014/0032589 A1* | 1/2014 | Styler | G06F 17/3097 |
| | | | 707/767 |
| 2014/0095866 A1* | 4/2014 | Grebennikov | H04L 9/3268 |
| | | | 713/156 |
| 2014/0100923 A1* | 4/2014 | Strezo | G06Q 10/067 |
| | | | 705/7.39 |
| 2014/0359280 A1 | 12/2014 | Saboor et al. | |
| 2015/0074390 A1* | 3/2015 | Stoback | H04L 63/1483 |
| | | | 713/156 |
| 2016/0182492 A1* | 6/2016 | Bean | H04L 63/0823 |
| | | | 713/156 |

OTHER PUBLICATIONS

Antonyma, et al., "Microsoft tries to address PKI issues in IE11 (SmartScreen and SNDS)", Published on: Jan. 3, 2014, Available at: http://a-infosec.com/2014/03/01/ie11_pki_snds/, 8 pages.

Braun, et al., "CA Trust Management for the Web PKI", In Journal of Computer Security, vol. 22, Issue 6, Nov. 1, 2014, 42 pages.

Dong, et al., "Pinning & Binning: Real Time Classi?cation of Certi?cates", In Proceedings of Annual Computer Security Applications Conference, Dec. 12, 2013, 2 pages.

Hoz, et al., "Detecting and Defeating Advanced Man-In-TheMiddle Attacks against TLS", In Proceedings of 6th International Conference on Cyber Conflict, Apr. 2014, pp. 209-221.

Paganini, Pierluigi, "How Cybercrime Exploits Digital Certificates", Published on: Jul. 28, 2014, Available at: http://resources.infosecinstitute.com/cybercrime-exploits-digital-certificates/, 25 Pages.

The PCT Search Report and Written Opinion dated Jun. 7, 2016 for PCT application No. PCT/US2016/027654, 10 pages.

The PCT Written Opinion of the International Preliminary Examining Authority dated Aug. 18, 2016 for PCT application No. PCT/US2016/027654, 6 pages.

\* cited by examiner

PROBABILISTIC CLASSIFIERS FOR CERTIFICATES

BACKGROUND

Authentication infrastructures may seek to provide secure communication between entities. In some instances, an authentication infrastructure uses public key certificates that have been issued from a certification center by a Certificate Authority (CA). These public key certificates are used to certify that a public key is owned by a named entity on the public key certificate. Under this infrastructure, a system relies on an individual issuing CA's and the hierarchy of CA's being trusted and uncompromised. However, these authentication infrastructures have been under attack, which has compromised secure communications. Currently, because CA's are completely trusted to certify the identity of a secure web site, a single compromise of a CA can compromise the whole authentication infrastructure. For example, an unauthorized third party who has improperly accessed and issued new certificates signed by the trusted CA is able to fraudulently represent itself with a technically valid public key certificate for the purpose of gaining access to unauthorized information.

SUMMARY

This application describes techniques to identify certificates that are being used improperly. In one embodiment, a client device employs a classifier (e.g., model, set of algorithms, etc.) to determine a probability that a received certificate is being used improperly (e.g., fraudulently, maliciously, etc.). The classifier may be trained and distributed to the client device by a trusted entity. A classifier may be constructed, or trained, by applying machine learning methods to a collection of valid, authorized certificates. This training may allow the classifier to detect valid but potentially improper certificates (e.g., improperly used). After a classifier is trained, the trusted entity may distribute the classifier to client devices.

In one embodiment, a classifier may be used to analyze a certificate received by a client device. The analysis may determine a probability that the certificate conforms to the learned behavior of other valid, authorized certificates. Based on this probability, the classifier may take an action. For example, the classifier may allow communication with the unverified entity, provisionally block communication with the unverified entity while waiting for user input, warn the user of a potentially malicious communication, block communication with the unverified entity entirely, and so on.

In some instances, certificates received by a client device may be stored and sent to the trusted entity to update the training data used to train a classifier. For example, certificates may be stored at a predefined sampling percentage. The sampling percentage may be determined based on the probability that the certificate is being used improperly. In one embodiment, the sampling percentage may be higher (more certificates stored) for certificates having a higher probability of being used improperly. For instance, for a certificate having a relatively high probability of being used improperly (e.g., 75% chance), the sampling percentage for storing that certificate may be relatively high (e.g., store 50% of certificates with this probability). Conversely, for a certificate with a relatively low probability of being used improperly (e.g., 25% chance), the sampling percentage for storing that certificate may be relatively low (e.g., store 10% of certificates with this probability).

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items. Moreover, the figures are intended to illustrate general concepts, and not to indicate required and/or necessary elements.

DETAILED DESCRIPTION

Figure 1:
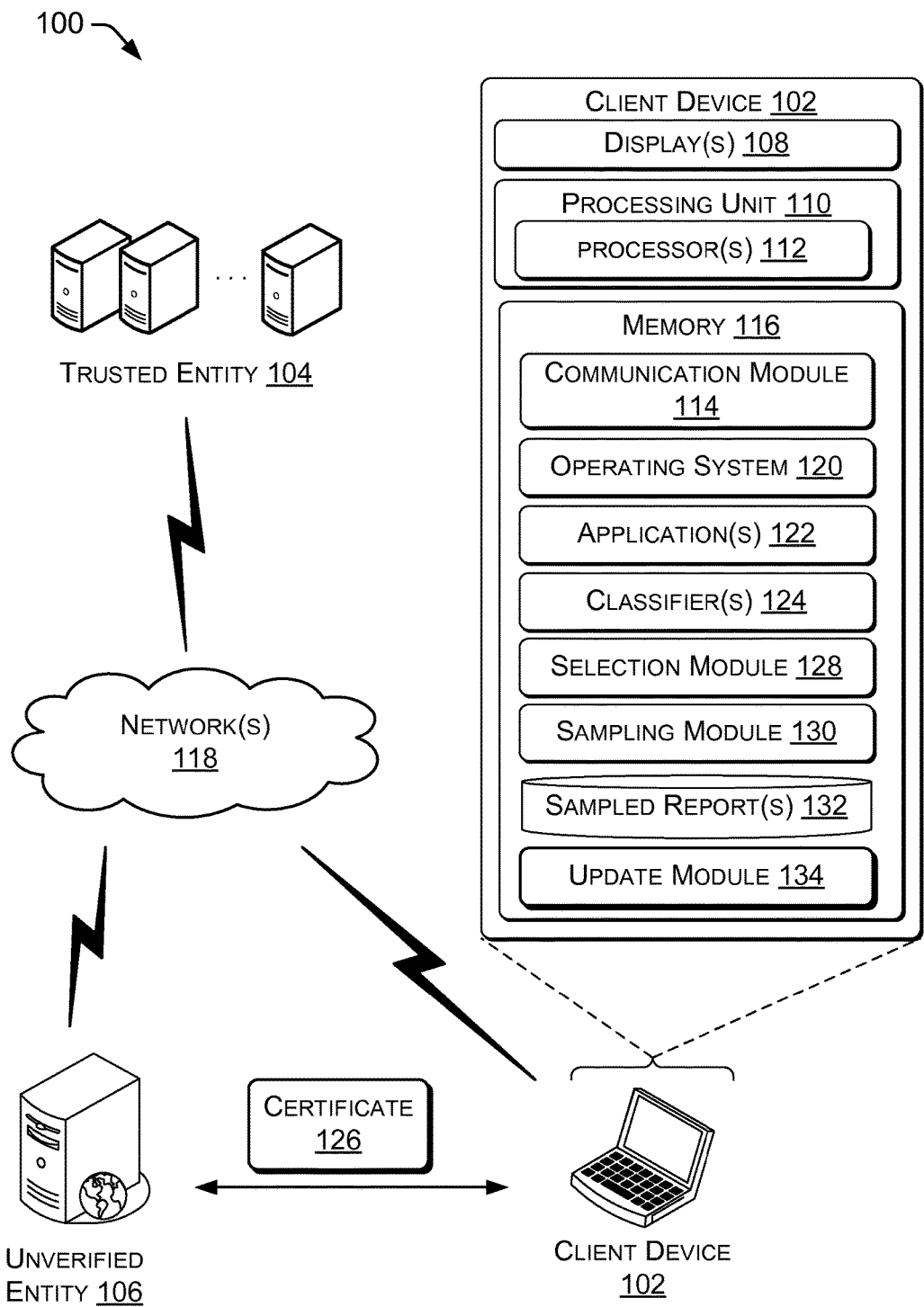
FIG. 1 shows an example architecture for training, distributing, and/or using classifiers to identify certificates that are potentially being used improperly.

As discussed above, in current authentication infrastructures, an entity may fraudulently represent itself as a trusted entity by using a valid public key certificate (e.g., digital certificate). For example, an entity may obtain a public key certificate that is issued by a trusted Certificate Authority (CA) and meets the structural requirements (e.g., format requirements) of a valid certificate. Subsequently, the entity may utilize the public key certificate, which is valid and appears to be non-fraudulent, to establish secure communications. This may potentially allow the entity to gain unauthorized access to information.

This application describes techniques to identify certificates that are being used improperly (e.g., potentially malicious, fraudulent, etc. certificates). The techniques described herein may be implemented using one or more machine-learning trained classifiers. For instance, a trusted entity (e.g., an operating system (OS) distributor, anti-virus software provider, etc.) may obtain a relatively large number of certificates or reports from various CAs and store the certificates in a data store. The trusted entity may then apply machine-learning models (e.g., linear models, neural models, deep neural networks, etc.) to the certificates or reports to create machine-learning trained classifiers. These classifiers may be any type of classifier, such as general certificate classifiers, certificate type-specific classifiers, certificate domain-specific classifiers, certificate issuer-specific classifiers, etc. The classifiers, when trained, may be able to identify a characteristic (e.g., format, etc.), attribute, or any other observed, learned behavior that is common to a previously received certificate. Once the trusted entity has trained the classifiers, the classifiers may be distributed to a client device. The classifiers may be distributed at the point of sale of the client device, as part of the operating system (OS) of the client device, as an update for the client device, and so on.

At a client device, a classifier may be employed to classify certificates from an unverified entity. For example, a user of the client device may be browsing the Internet and receive a request from a website to communicate via a secure channel. The classifier may further receive a certificate from the unverified entity, which identifies the unverified entity. The classifier may determine whether or not the certificate is a valid certificate issued from a known and/or trusted CA. For example, the classifier may determine whether a format of the certificate is in accordance with a particular standard, such as a widely accepted public key infrastructure standard (e.g., X.509, Pretty Good Privacy (PGP), SKIP, etc.). In some embodiments, the classifier is selected from a plurality of classifiers. The selection of the classifier may be based on a type of the certificate (e.g., domain validation, organization validation, etc.), an issuing CA for the certificate (e.g., Comodo®, Symantec®, Go Daddy®, GlobalSign®, etc.), and so on. The selected classifier may be trained for a particular type of certificate, a particular issuing CAs, and so on.

When the certificate is determined to be valid, the classifier may determine whether characteristics of the certificate are in accordance with learned characteristics of other valid, authorized certificates. For example, the learned characteristics may be characteristics of other certificates issued from an issuing CA of the certificate (e.g., Symantec®, Verizon®, Comodo®, etc.), characteristics of other certificates of the same type (e.g., Secure Sockets Layer (SSL), Code Signing certificates, etc.), etc. The classifier may compare the characteristics of the certificate with the learned characteristics of the other certificates. Based on this comparison, the classifier may output a probability that the certificate is being used improperly (e.g., maliciously, fraudulently, etc.). Based on the probability that the certificate is being used improperly, the classifier may take an action. For example, the classifier may allow communication with the unverified entity, notify a user of the client device that the unverified entity is unsafe or potentially malicious, block communications with the unverified entity, and so on.

The techniques described herein may be implemented in a variety of contexts including, for example, secure communications for web browsers, smart cards, wireless networks, smart cars (e.g., for route information and other data), download/upload applications, smart power grid applications, or any other context where a secure connection is used to communicate.

The techniques discussed herein may provide various technical advantages. In some embodiments, the techniques may provide for more secure communications over networks by providing an additional layer of security before entities engage in secure communications. Additionally, the techniques may assist in preventing viruses or other malicious intrusions onto a user's computer, which may in turn help increase computer speed, reduce processor load, and/or reduce cybercrime and risk. Further, the techniques may provide a more user-friendly experience by avoiding malicious websites and/or warning users of potentially malicious entities.

By way of example and not limitation, illustrative systems and devices suitable for implementing the techniques are described below with reference to the figures.

Example Architecture

FIG. 1 shows an example architecture 100 illustrating techniques for training, distributing, and/or employing classifiers to identify certificates that are potentially being used improperly. The system 100 includes a client device 102 (sometimes referred to as a "computing device 102") which may be implemented as any type of computing device including, but not limited to, a laptop computer, a tablet, a smart phone, a desktop computer, a server, an electronic reader device, a mobile handset, a personal digital assistant (PDA), a portable navigation device, a watch, a portable media player, a computer monitor or display, a set-top box, a computer system in a vehicle, an appliance, a camera, a robot, a security system, a game console, a smart television (TV), a smart car, and so forth. In some instances, the client device 102 may comprises a mobile device, while in other instances the device may be a stationary device.

The client device 102 may be in communication with a trusted entity 104 and an unverified entity 106. The trusted entity 104 may be any entity that has previously established trust with a computing device, such as a software developer and/or distributor (e.g., Microsoft®), an anti-virus software provider (e.g., McAfee®, Norton®, etc.), a CA (e.g., Symantec®, Comodo®, etc.), an enterprise (which may have provided the client device 102 for business use), and so on. The unverified entity 106 may be any entity with which the computing device 102 may communicate, for example, a website, a social networking platform (e.g., Facebook®, LinkedIn®, Twitter®, etc.), a payment collection service (e.g., Paypal®, WePay®, etc.), other computing devices, and so on. The unverified entity 106 may be implemented as one or more computing devices, one or more servers, one or more desktop computers, or any other computing device which includes one or more processors communicatively coupled to memory. The one or more computing devices may be configured in a cluster, data center, cloud computing environment or a combination thereof.

The client device 102 may include a display 108 and a processing unit 110, which may include one or more processors 112, and memory 116 communicatively coupled to the processing unit 110. The one or more processors 112 may include a central processing unit (CPU), graphics processing unit (GPU), a microprocessor, and so on. The client device 102 may further include additional elements, such as a microphone, a touch screen, a wireless network sensor, an accelerometer, a compass, a gyroscope, a Global Positioning System (GPS), or other elements.

As illustrated, the memory 116 may include a communication module 114 that enables the client device 102 to communicate with other devices over one or more networks 118. The memory 116 may also include an operating system 120 which may manage resources of the client device 102 and/or provide functionality to application(s) 122. The application(s) 122 may be various applications, such as a web browser, a mobile application, a desktop application, or any other application. In one example, the application(s) 122 may be a web browser that uses the communication module 114 to communicate with the unverified entity 106 over the one or more networks 118. The one or more networks 118 may include any one of or a combination of multiple different types of networks, such as cellular networks, wireless networks, Local Area Networks (LANs), Wide Area Networks (WANs), Personal Area Networks (PANs), and the Internet.

In some embodiments, classifier(s) 124 may also be stored in the memory 116 of the client device 102. In some embodiments, the classifier(s) 124 may be implemented as part of the operating system 120, while in other embodiments the classifier(s) 124 is implemented as in an application or another structure. The classifier(s) 124 may receive a certificate 126 from the unverified entity 106, such as over the one or more networks 118. The classifier(s) 124 may employ various techniques to determine a probability that the certificate 126 is being used improperly, as discussed in more detail below. The probability may be used to determine, for example, whether or not a secure connection should be made with the unverified entity 106. The unverified entity may be requesting a secure connection to access information on the client device 102 (e.g., payment information, geographic location information, etc.), download/upload data, or to perform any other communication functionality.

The classifier(s) 124 may be selected by a selection module 128. The selection module 128 may be stored on the memory 116, and may observe or identify characteristics of the certificate 126. Based on these characteristics, the selection module 128 may select one of the classifier(s) 124, or multiple classifier(s) 124, to employ in determining the probability that the certificate 126 is being used improperly. For example, the selection module 128 may identify a certificate as being issued from a particular CA, and based on the CA, select a classifier(s) that is specifically trained for certificate from that particular CA.

The probability that the certificate 126 is being used improperly may also be used by a sampling module 130 to determine a sampling percentage at which the certificate 126 is stored. The sampling module 130 may be associated with different sampling percentages based on different probabilities that a certificate is being used improperly, details of which will be discussed in further detail below. The certificate 126 may be sampled and stored in the memory 116 with one or more other sampled report(s) 132. For example, the certificate 126 may be sampled (e.g., selected) at a predefined rate to be stored for later analysis. In some embodiments, sampled report(s) 132 (of certificates that are sampled/selected for storage and further analysis) may be sent by the communication module 114 via the one or more networks 118 to the trusted entity 104, where the sampled report(s) 132 may be used to update training data for training the classifier(s) 124.

The memory 116 may further store an update module 134 to update the classifier(s) 124. In some embodiments, once the trusted entity 104 has updated the classifier(s) 124, the updated classifiers may be sent to the client device 102 via the one or more networks 118 where the update module 134 updates the classifier(s) 124 stored in the memory 116.

Example Trusted Entity

Figure 2:
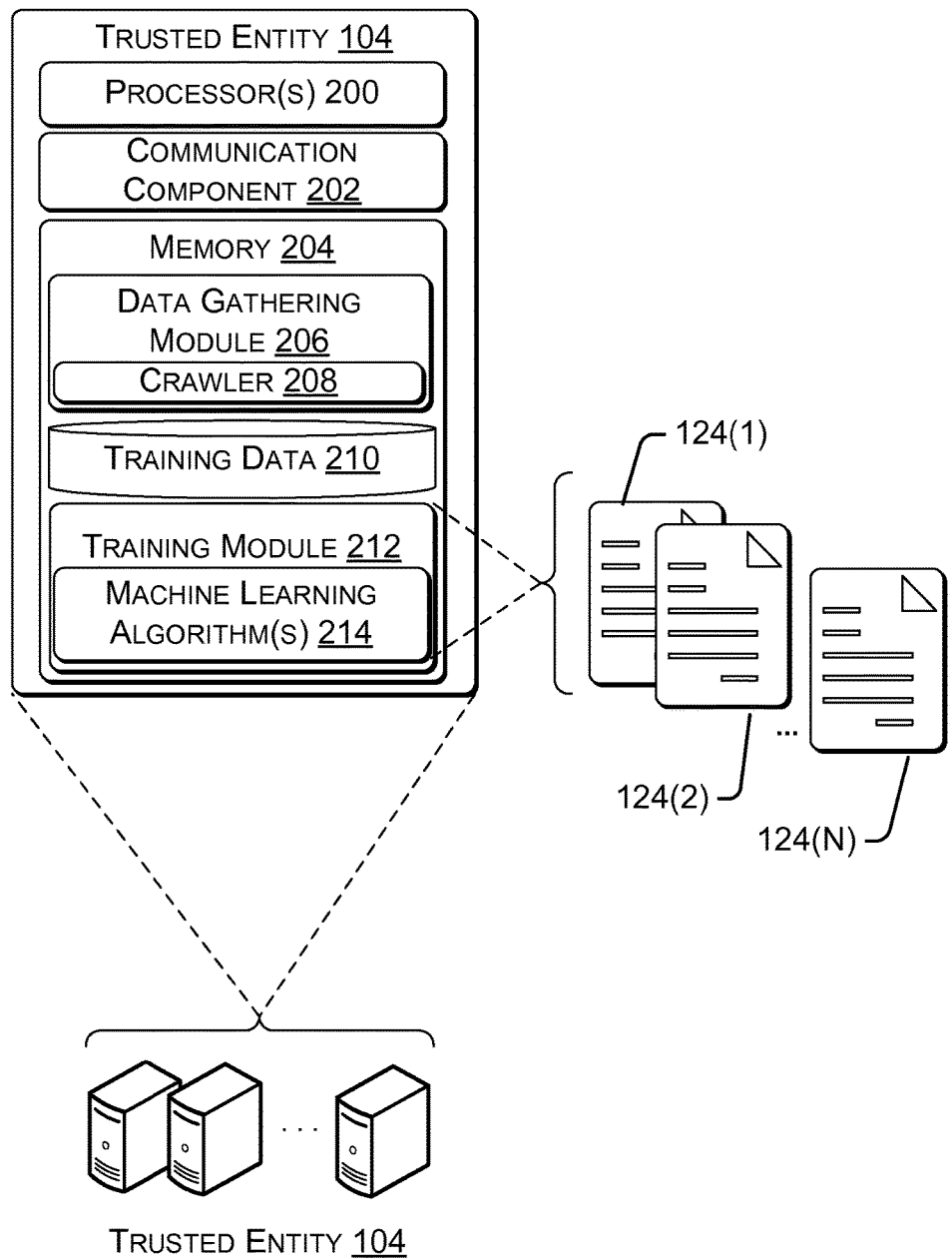
FIG. 2 shows example details of a trusted entity.

FIG. 2 shows example details of a trusted entity, such as trusted entity 104 as depicted in the example architecture 100, configured to train classifiers. The trusted entity 104 may be implemented as one or more computing devices, such as one or more desktop computers, laptop computers, servers, and so on. The one or more computing devices may be configured in a cluster, data center, cloud computing environment or a combination thereof. In one example, the one or more computing devices provide cloud computing resources, including computational resources, storage resources and the like.

In the example shown, trusted entity 104 includes multiple classifier(s) 124(1), 124(2), . . . , 124(N) (collectively "classifier(s) 124"), where N is any integer greater than or equal to 1. The trusted entity 104 may contain one or more processors 200, a communication component 202, and memory 204 communicatively coupled to processor(s) 200. In some embodiments, the memory 204 may include a data gathering module 206, which may include a crawler 208. The data gathering module 206 may obtain certificates, in for example, sampled report(s) 132, and store the certificates in the memory 204 to be used as training data 210. The data gathering module 206 may receive certificates that have been collected by users, such as from the sampling module 130 of client device 102 as shown in FIG. 1. Additionally, the data gathering module 206 may employ crawler 208 (e.g., a web crawler) to crawl a web or other source and obtain certificates for use as training data 210.

Using this training data 210, training module 212 employs machine learning algorithm(s) 214 to train the classifier(s) 124. The machine-learning algorithm(s) 214 may be models, such as linear models, neural models, deep neural models, etc. Through the training, the classifier(s) 124 are created. In some instances, multiple classifiers are trained for different contexts, while in other instances a single classifier may be trained to handle all certificates. The classifier(s) 124 are trained to identify and learn behavior of issuing CAs and/or characteristics of certificates stored in the training data 210.

In some embodiments, the classifier(s) 124 may be specifically trained for a particular type of certificate, a particular CA, a particular source (e.g., website), a particular user type (e.g., based on the user's language, location, culture, etc.), and so on. For example, one of the classifier(s) 124 may be trained to handle a particular type of certificate, certificates from a particular CA, certificates from a particular source, certificates from a particular user type, and so on. In one example, a classifier may be trained for a particular issuing CA to identify a commonly observed geographic location of where certificates are issued by the particular issuing CA (e.g., a location where more than a threshold number of certificates are issued for the particular issuing CA). Thus, when implemented to classify a certificate (e.g., at a client device), the classifier trained for the particular issuing CA may determine that a location of the certificate is the same as, or different from, the observed geographic location for that issuing CA. Based on that determination, the classifier may output a probability that the certificate is being used improperly, or a probability that the certificate was authorized by the particular issuing CA (e.g., if the certificate is associated with a same location as the issuing CA, then the probability may be relatively low, and if the certificate is associated with a different location, then the probability may be relatively high). In another example, one of the classifier(s) 124 may be trained for use by a particular user type. For instance, a group of users may be identified as "high-risk" due to the users frequently visiting websites (e.g., more than a threshold number of times), or having other contact with entities, that are using fraudulent certificates. Here, a classifier may be specifically trained for the group of "high-risk" users to be implemented on their client devices. For instance, the classifier may be associated with more stringent rules for classifying certificates (e.g., determine a higher probability of being used improperly than another classifier would determine) and/or may output a relatively higher probability that a certificate is being used improperly. In a further example, one of the classifier(s) 124 may be trained for a particular type of certificate. For example, a classifier may be trained to be applied to Extended Validation Secure Sockets Layer (EV SSL) certificates. Thus, when an EV SSL certificate is received the classifier may, for instance, determine whether a period of time during which the received certificate is valid is the same as, or different from, an observed period of time during which other EV SSL certificates are valid. Based on the determination, the classifier may output a probability that the certificate is being used improperly.

Further, in some instances a classifier may be trained to account for multiple characteristics of a certificate, such as a location associated with the certificate, a period of time during which the certificate is authorized for use, a purpose of the certificate, etc. Each of the different characteristics may be weighted differently depending on a predefined level of importance for that characteristic. For example, a classifier may be trained to take into account both the period of time during which a received certificate is authorized as well as the purpose of the certificate. To illustrate, the classifier may be trained to weight the period of time during which a received certificate is authorized more heavily than the purpose of the certificate, resulting in the period of time during which the received certificate is authorized affecting more heavily the determination of the probability that the certificate is being used improperly.

Example Processes

Figure 3:
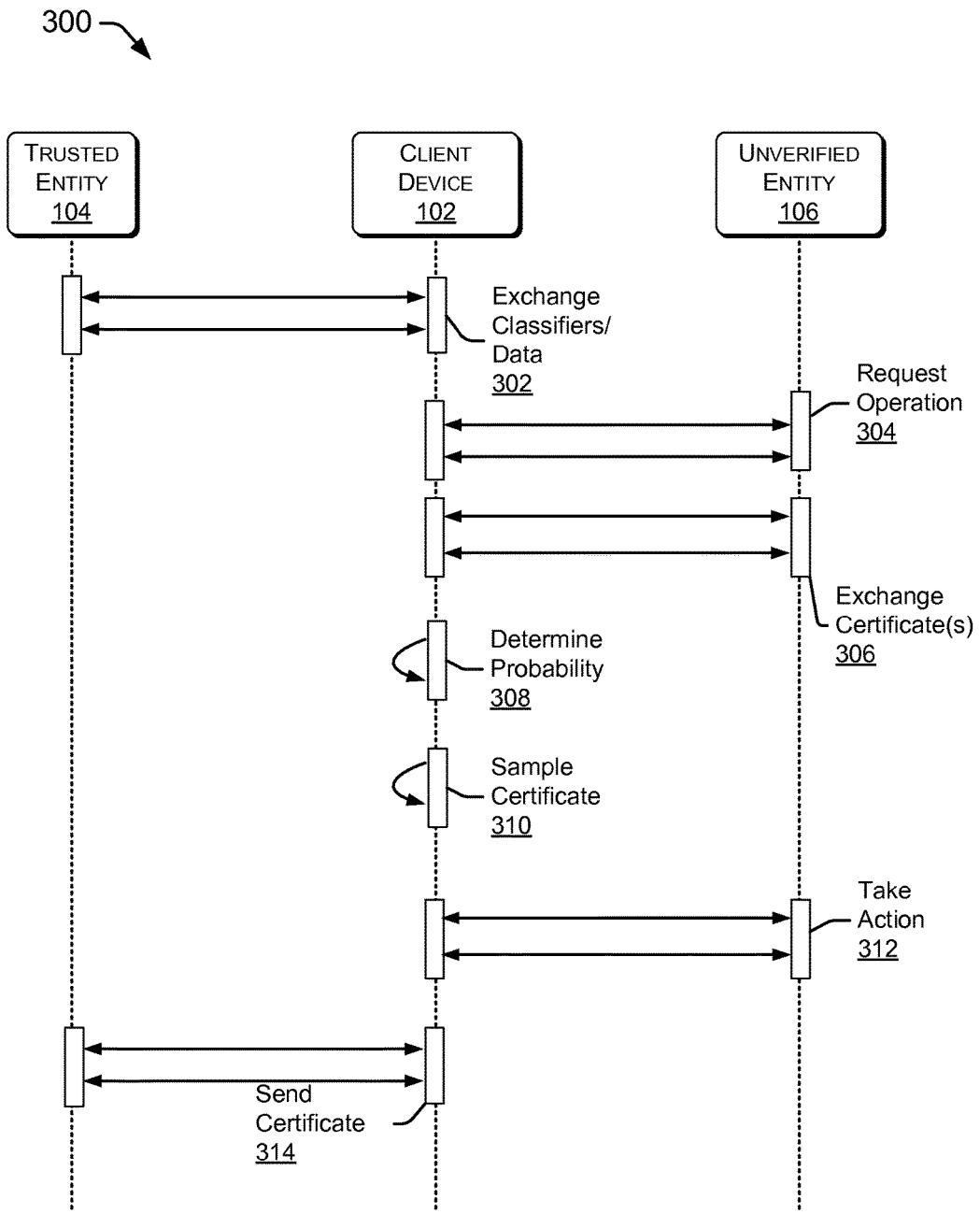
FIG. 3 shows an example timing and event diagram for identifying certificates that are potentially being used improperly.

FIG. 3 shows an example timing and event diagram 300 for identifying certificates that are potentially being used improperly. The operations shown in the timing and event diagram 300 may be performed by the client device 102, the trusted entity 104, and/or the unverified entity 106. Further, in other implementations, operations shown in the example timing and event diagram 300 may be entirely, or in part, performed by other computing devices.

At 302, the trusted entity 104 may distribute classifiers to the client device 102. That is, the trusted entity 104 and the client device 102 may exchange classifiers and/or other data. In one embodiment, the classifiers are distributed to the client device 102 via a manufacturer, distributor, or other entity in a supply chain. That is, the classifiers are sent to the manufacturer, distributor, or other entity so that the classifiers may be installed on the client device 102 before the client device 102 is distributed to or otherwise purchased by a customer at a point-of-sale. In another embodiment, the classifiers may downloaded and installed as part of a software package (e.g., Microsoft® System Center Endpoint Protection), such as an anti-virus software package or other application package. In a further embodiment, the classifiers may have already be provided to the client device 102, and operation 302 may include sending an update to the classifiers, such as in an operating system update or other type of update. For example, operation 302 may be accomplished using a software update delivery system (e.g., Windows® Update, Advanced Package Tool (APT), Yellowdog Updater Modified (YUM), etc.). In other embodiments, any combination of the above mentioned embodiments may be implemented. In some instances, the classifiers may be downloaded from a physical memory device, such as a compact disc, portable disk drive, and so on, while in other instances, the classifiers may be downloaded over a network, such as the one or more networks 118.

At 304, the client device 102 may prompt the unverified entity 106 and request an operation. For example, the client device 102 may prompt the unverified entity 106 to allow access to a service provided by the unverified entity 106, such as an electronic mail service provider (e.g., Hotmail®, Outlook®, etc.). Alternatively, or additionally, the unverified entity 106 may prompt client device 102 to perform an operation (e.g., communicate, access information, send/receive data, etc.). That is, an operation may be requested. For example, the unverified entity 106 may be a navigation service which requests access to geographic location information of the client device 102. The unverified entity 106 may prompt a user of the client device 102 for access to information obtained through a Global Positioning System (GPS) of the client device 102 in order to provide accurate directions from the user's current location to a destination indicated by the user.

At 306, the client device 102 receives a certificate from the unverified entity 106 to establish trust for establishing a secure communication channel to perform the requested operation. In other words, at 306 a certificate(s) may be exchanged. In one example, the client device 102 may additionally, or alternatively, send a certificate to the unverified entity 106 representing itself to the unverified entity 106.

At 308, the client device 102 employs classifiers to determine whether the received certificate is valid. In determining whether the received certificate is valid, the classifiers may identify that the certificate is issued by a trusted CA, and meets the structural requirements of a valid certificate as defined by an applicable cryptography standard (e.g., X.509, PGP, SKIP, etc.).

In cryptography, a system of Certificate Authorities (CAs) follows a hierarchical order and standard for issuing certificates. A standard may specify formats for, among other things, public key certificates, certificate revocation lists, attribute certificates, etc. As used herein, a "valid" or "technically valid" certificate refers to a public key certificate that has been issued by a trusted CA and/or that follows a standard format or structure, such as a widely accepted international public key infrastructure (e.g., X.509). For example, the structure of a valid or technically valid certificate may include certificate information, such as the version (e.g., X.509, PGP, SKIP, etc.), serial number, algorithm information, issuer, validity time period, subject, subject public key information, issuer unique identifier, subject unique identifier, extensions, certificate signature algorithm, and/or certificate signature.

Upon determining that the received certificate is valid, the classifiers at the client device 102 may determine a probability that the received certificate is being used improperly. In one example, the probability may be output as a percentage or other value. The classifiers may compare the received certificate with the trained model, which indicates learned behavior of the issuing CA and/or characteristics of certificates based on training data. In determining the probability that the certificate is being used improperly, the classifiers may identify differences between characteristics of the received certificate and the learned characteristics of certificates used as training data. Based on these differences, the classifiers may output a probability that the certificate, although valid, is being used improperly.

At 310, client device 102 may determine whether or not to store the certificate based on a predefined sampling percentage. That is, whether or not to sample the certificate. In one embodiment, the determination is performed by classifier(s), while in other embodiments the determination is made by a sampling module independent from the classifier(s). The predefined sampling percentages may correspond to the probability percentage that the received certificate is being used improperly. In one example, the sampling percentage may be used to sample certificates for storage at a higher percentage rate for certificates that have a higher probability percentage, and to sample a lower percentage of certificates for storage when the certificate has a lower probability percentage. For example, if the probability percentage that the received certificate is being used improperly is 75%, the corresponding sampling percentage for storage may be at a 40% rate. Similarly, if the probability percentage that the received certificate is being used improperly is 25%, the corresponding sampling percentage for storage may be at a 5% rate. However, this is merely an exemplary embodiment, and any probability percentage may correspond to any sampling percentage. In one embodiment, received certificates may be sampled and stored in different groups, corresponding to the sampling percentage and/or the probability percentage.

At 312, the classifier(s) may determine an action to be taken based on the probability that the received certificate is being used improperly. For example, if the probability percentage is below a lower threshold (e.g., it's unlikely the certificate is fraudulent), then the classifier(s) may determine to allow the unverified entity 106 to communicate with the client device 102 using a secure channel. Conversely, if the probability percentage is above a high threshold (e.g., it's highly likely the certificate is being used fraudulently), then the classifier(s) may determine to block the unverified entity 106 from any communication with the client device 102. Further, if the probability percentage is between the high and low thresholds, the client device 102 may, for example, provisionally block communication with the unverified entity 106, notify the user of potential fraudulent activities, and prompt the user to decide between continuing to communicate with the unverified entity 106, or block the communication. One example of blocking the communication may include referring the certificate to a filter or a security protection service (e.g., anti-virus service, Microsoft SmartScreen®, etc.). In some embodiments, the unverified entity 106 may be directed to the trusted entity 104 to communicate, for instance, if session cannot be secured. Additionally, it should be appreciated that in other embodiments, any of the described actions may be applied to any of the thresholds.

At 314, the client device 102 may send the sampled certificate(s) as telemetry data to the trusted entity 104 for further use in training and updating classifiers. The operation 314 may be triggered by detecting a change in certificates that affect the classifiers. Alternatively, the event may be triggered by a periodic update (e.g., weekly, daily, or hourly updates). For example, the client device 102 may send all of the sampled certificates as telemetry data to the trusted entity 104 for use as training data. Telemetry data, as used herein, refers to data collected and transmitted as part of an automated task. In a different embodiment, the classifier may choose only certain groups of sampled certificates to send to the trusted entity 104 as telemetry data based on the probability percentages of each of the groups of certificates.

Figure 4:
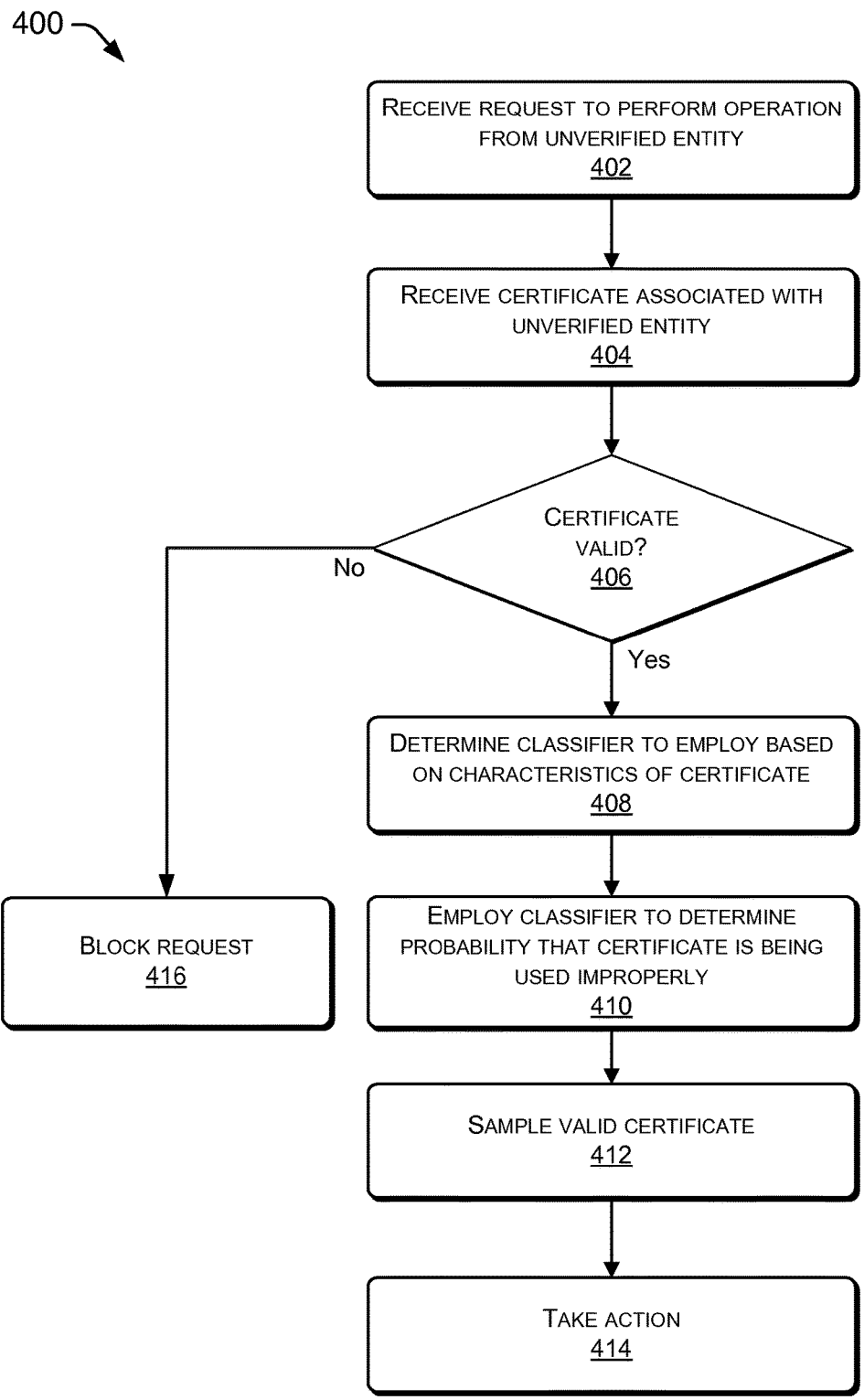
FIG. 4 is a flow diagram of an example process to identify certificates that are potentially being used improperly.
Figure 5:
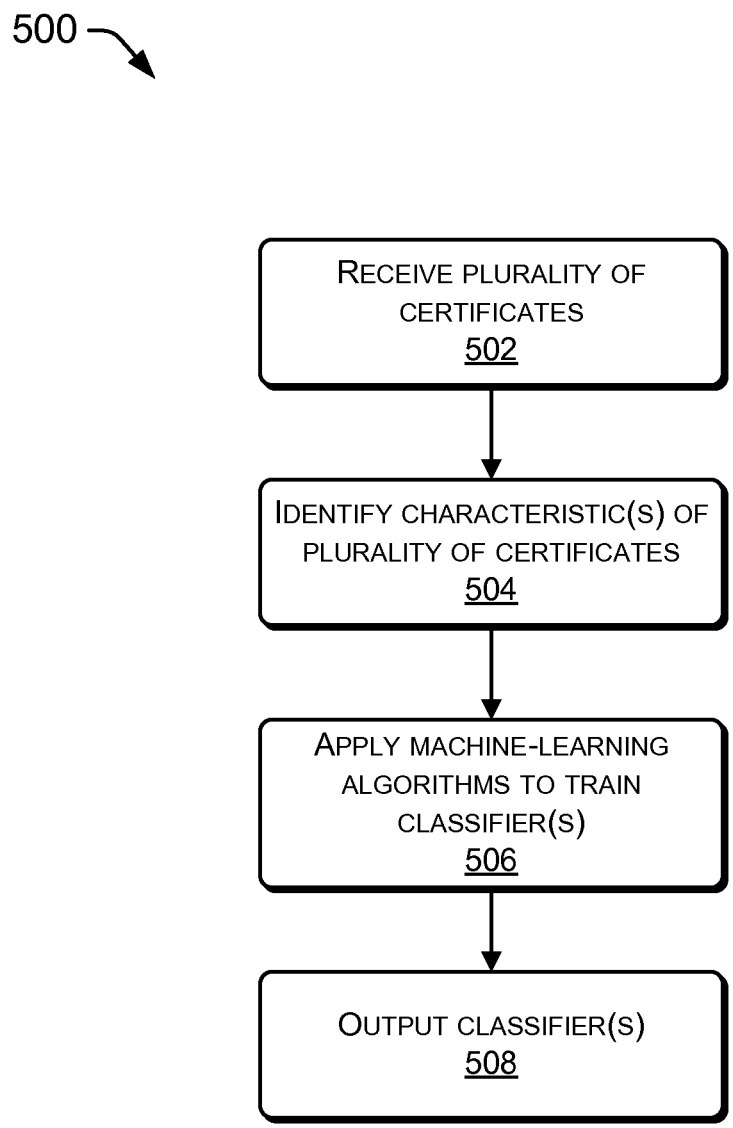
FIG. 5 is a flow diagram of an example process to train a classifier using machine-learning techniques.

FIGS. 4 and 5 illustrate example processes in flow diagrams. The processes (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the individual operations may be omitted.

FIG. 4 is a flow diagram showing an example process to identify certificates that are potentially being used improperly.

At 402, a request to perform an operation may be received. In the example of FIG. 1, the client device 102 receives the request to perform an operation from the unverified entity 106. However, in other examples, the client device 102 may send the request to the unverified entity 106. The operation that is being requested may be any type of operation that utilizes a secure connection, such as communication between two entities and/or accessing/sending information (e.g., sensitive, confidential, or other types of information). In one example, the unverified entity 106 may be a web site, an application (e.g., an email application), a payment service, or any other entity with which a client device may engage in secure communications.

At 404, a certificate associated with the unverified entity is received. The certificate may be validly signed by a Certificate Authority that is trusted in an authentication infrastructure. Additionally, the form of and data contained in the certificate may meet standards set for certificates, such as the X.509 standard.

At 406, it may be determined if the certificate is valid. If it is determined at operation 406 that the certificate is valid, then the process 400 moves on to 408. If it is determined at 406 that the certificate is not valid, the process 400 may proceed to operation 416, where the operation requested from the unverified entity is blocked from being performed (e.g., block communication with the unverified entity).

At 408, a determination of a classifier to be employed is made based at least in part on characteristics of the received certificate. For example, the classifier may be selected based on a type of the certificate (e.g., domain validation, organization validation, etc.), an issuing CA for the certificate (e.g., Comodo®, Symantec®, Go Daddy®, GlobalSign®, etc.), and so on. The selected classifier may be trained for a particular type of certificate, a particular issuing CA, and so on. For example, it may be determined that the received certificate was issued by Symantec®. Based on this determination, a classifier that has been trained with training data comprising certificates issued from Symantec® may be selected. This may allow for a more accurate determination of a probability percentage that the certificate is being used properly because the classifier is trained with more relevant certificates. In some instances, a determination may be made to use multiple classifiers. For example, multiple classifiers may be determined to be employed, such as a type-specific classifier and an issuer-specific classifier. However, any combination of classifiers may be selected and employed in conjunction.

At 410, a probability that the valid certificate is being used improperly is determined. In the example of FIG. 1, this operation may be performed by the classifier(s) 124 on the client device 102 (e.g., client-side implementation). However, in other embodiments, operation 408 may be performed by classifiers located at the trusted entity 104 (e.g., server-side implementation). As described above with reference to FIGS. 1 and 2, the classifier(s) 124 may be trained by applying machine-learning training models to large data stores of certificates received as telemetry data. Once trained, the classifier(s) 124 may be trained to identify known, learned characteristics or behavior of certificates and/or their issuers. At 410, based on a comparison between characteristics of the received certificate and characteristics of other certificates, the classifier(s) 124 may output a probability that the certificate is being used improperly. Characteristics of the certificates that the classifier(s) 124 may consider include, but are not limited to, a period of time during which the certificate is valid (e.g., start and end dates), presence or absence of revocation information (e.g., the location of a service provided by the CA to query whether or not the certificate has been revoked), when the certificate was issued, the issuing certificate authority, a geographic location where the certificate was issued and a geographic location of the issuing certificate authority, a type of the certificate (e.g., extended validation, organizations validation, domain validation, etc.), and/or a purpose of the certificate (e.g., encryption, signature, etc.) (which may be indicated by, for example, the extended key usage (EKU) in the X.509 standard, or any other key-usage indicator or extension). In some embodiments, the probability that the certificate is being used improperly is a binary output (e.g., "yes" or "no," "1" or "0"). While in other embodiments, the probability that the certificate is being used improperly is output as a percentage (e.g., 65% chance the certificate is fraudulent) or other value. Further, in some instances multiple classifiers may be employed in combination to determine a probability that the valid certificate is being used improperly. For example, it may be determined to employ both an issuer-specific classifier and a type-specific classifier based on characteristics of the certificate. Once the classifiers have been employed, their outputs may be combined as an aggregate probability that a certificate is being used improperly. In some instances, the outputs of the classifiers may be weighted differently.

At 412, the valid certificate is sampled for storage. In some embodiments, all received certificates may be sampled to be stored, while in other embodiments, selected percentages of certificates may be sampled to be stored. For example, at 412, received certificates may be sampled for storage based on predefined percentages. The sampling percentages may in some embodiments correspond or apply to certain probability percentages. For example, at 412, certificates with a higher probability percentage that they are being used improperly may be sampled at a higher rate, and certificates with a lower probability percentage that are being used improperly may be sampled at a lower rate. The sampled certificates may be grouped or stored with certificates having the same probability percentage or sampling percentage, and/or grouped with certificates that have a probability percentage or sampling percentage that fall within a same predefined range. In some embodiments, the sampled certificates may be temporarily stored at the client device 102. The stored certificates may then be sent to trusted entity 104 for further analysis. In some embodiments, the sent certificates may be used for further training and updating of classifiers by the trusted entity 104.

At 414, an action may be taken. The action may be allowing the client device to perform a requested operation with the unverified entity, provisionally blocking performance of the requested operation, prompting a user of the client device for input, blocking performance of the requested operation, and so on. In some embodiments, the action taken may be based on the probability that the certificate is being used improperly. For example, predefined thresholds in which the probability percentage that the certificate is being used improperly falls into may determine the action to be taken. If the probability percentage falls below a lower threshold, the action taken may be allowing the requested operation to be performed (e.g., allowing communication with the unverified entity). If the probability percentage is above a higher threshold, the action taken may be to block the requested operation (e.g., block communication with the unverified entity). However, in different embodiments, any action may be taken for any probability percentage.

FIG. 5 is a flow diagram showing an example process 500 to train classifier(s) using machine-learning techniques.

At 502, a plurality of certificates may be received. For example, certificates may be received from client devices and stored. Alternatively, a web crawler may be employed to crawl the World Wide Web, or an Intranet in some embodiments, and obtain certificates. The certificates may be stored in a data store and/or on servers of a trusted entity in some embodiments.

At 504, characteristics of the certificates are identified. In one embodiment, the identified characteristics may be information in the certificate that is required according to a public key infrastructure standard, such as X.509, SKIP, etc. In identifying the characteristics, characteristics may be identified for different certificate issuers, and/or for different certificate types. For example, characteristics of certificates issued from a single issuer (e.g., Symantec®, Comodo®, etc.) may be identified.

At 506, machine-learning algorithms may be applied to the plurality of certificates to create one or more classifiers. For example, machine-learning concepts, such as artificial neural networks, deep learning methods, ensemble methods, linear methods, or any other type of machine-learning concept, may be used to train the classifiers. The machine-learning algorithms may be applied to the plurality of certificates, whose characteristics have been identified. Based on identified characteristics of the plurality of certificates, the machine-learning algorithms may train one or more classifier(s) to learn common behavior or characteristics of the plurality of certificates (e.g., characteristics that are found more than a threshold number of times across a particular number of certificates). The characteristics may be issuer specific, certificate type specific, context specific, or user specific. Once the classifier(s) are trained to identify learned characteristics of certificates, the classifier(s) may be applied to newly received certificates and output a probability that the certificates are being used improperly. For example, the classifier(s) may compare learned, common characteristics of certificates contained in their model with a newly received certificate and, based on the differences between the certificate and the classifier model, output a probability that the newly received certificate is being used improperly. The output may be in the form of a probability percentage or other value.

At 508, the classifiers are output. In one embodiment, the classifier(s) may be sent to be preinstalled on the client device before sale of the device. For example, the classifier(s) may be implemented within the OS of a client device before purchase by a consumer. In another embodiment, the classifiers may be output as downloadable content from a physical device, such as a compact disc or other external memory. In a further embodiment, the classifiers may be output over a network, such as the Internet or an Intranet, as a software package or a software update. For example, the classifiers may be downloaded as part of a periodic software update (e.g., Windows® Update).

As used herein, memory may include "computer-readable media." Computer-readable media includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other medium that can be used to store information for access by a computing device. In contrast, communication media may embody computer-readable instructions, data structures, program modules, or other data that is defined in a modulated data signal, such as in conjunction with a carrier wave. As defined herein, computer storage media does not include communication media.

While certain functions are described herein as being implemented by modules executable by one or more processors and other components, any or all of the modules or other components may be implemented in whole or in part by one or more hardware logic components to execute the described functions. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Further, while various modules are discussed herein, their functionality and/or similar functionality could be arranged differently (e.g., combined into a fewer number of modules, broken into a larger number of modules, etc.).

Examples

Example A, a computing device comprising: one or more processors; a display communicatively coupled to the one or more processors and configured to display content; memory communicatively coupled to the one or more processors; a communication module stored in the memory and executable by the one or more processors to: receive, from an unverified entity, a request to perform an operation with the unverified entity, the operation relating to communication with the unverified entity over a secure channel; and receive, from the unverified entity, a certificate associated with the unverified entity; a selection module stored in the memory and executable by the one or more processors to determine one or more classifiers to employ based at least in part on one or more characteristics of the certificate; and the one or more classifiers executable by the one or more processors to: determine that the certificate is valid and determine a probability that the certificate is being used improperly; cause the certificate to be stored in the memory based at least in part on a sampling percentage associated with the probability that the valid certificate is being used improperly; determine an action to be performed based at least in part on the probability that the certificate is being used improperly; and cause the stored certificate to be sent to a server to update classifier training data.

Example B, the computing device of example A, wherein the selection module is configured to determine one or more classifiers to employ by: selecting a single classifier; or selecting multiple classifiers to be used as a multi-stage classifier.

Example C, the computing device of A or B, wherein the selection module is configured to determine one or more classifiers to employ by: determining an issuer of the certificate; and selecting a classifier to employ based at least in part on the issuer of the certificate.

Example D, the computing device of any of examples A-C, wherein the selection module is configured to determine one or more classifiers to employ by: determining a type of the certificate; and selecting a classifier to employ based at least in part on the type of the certificate.

Example E, the computing device of any of examples A-D, wherein the one or more characteristics of the certificate comprise one or more of: a period of time during which the certificate is valid; a location of a service used to query whether the certificate has been revoked by a certificate authority; a time that the certificate was issued; the certificate authority that issued the certificate; a geographic location where the certificate was issued and a geographic location of the certificate authority for the certificate; a purpose of the certificate; or a particular combination of purposes of the certificate.

Example F, the computing device of any of examples A-E, wherein the one or more classifiers are configured to determine the probability that the certificate is being used improperly by: analyzing the one or more characteristics of the certificate using an algorithm of the one or more classifiers; identifying, based at least in part on the analyzing, one or more differences between the one or more characteristics of the certificate and learned characteristics of other certificates used to create the algorithm of the one or more classifiers; and determining, based at least in part on the one or more identified differences, the probability that the certificate is being used improperly.

Example G, the computing device of any of examples A-F, wherein the one or more classifiers are configured to cause the certificate to be stored by: determining that the probability is less than a threshold; based at least in part on determining that the probability is less than the threshold, causing the certificate to be stored in the memory according to a sampling percentage that is less than a predetermined sampling percentage.

Example H, the computing device of any of examples A-G, wherein the one or more classifiers are configured to cause the certificate to be stored by: determining that the probability is more than a threshold; based at least in part on determining that the probability is more than the threshold, causing the certificate to be stored according to a sampling percentage that is more than a predetermined sampling percentage.

Example I, a method comprising: receiving, by a computing device and from an unverified entity, a request to communicate via a secure channel; receiving a certificate from the unverified entity; selecting a classifier based at least in part on one or more properties of the certificate; using the classifier to: determine that the certificate is valid; determine a probability that the certificate is being used improperly; and determining an action based at least in part on the probability that the certificate is being used improperly, the action relating to communication with the unverified entity via the secure channel; and performing the action.

Example J, the method of example I, wherein determining an action based at least in part on the probability that the certificate is being used improperly comprises: determining that the probability that the certificate is being used improperly is greater than a threshold; and determining to block communication with the unverified entity via the secure channel.

Example K, the method of example I, wherein determining an action based at least in part on the probability that the certificate is being used improperly comprises: determining that the probability that the certificate is being used improperly is less than a threshold; and determining to allow communication with the unverified entity via the secure channel.

Example L, the method of example I, wherein determining an action based at least in part on the probability that the certificate is being used improperly comprises: determining that the probability is less than a first threshold and greater than a second threshold; and determining to present a notification that the certificate is potentially being used improperly.

Example M, the method of example L, wherein performing the action comprises presenting the notification that the certificate is potentially being used improperly, and the method further comprises: receiving user input regarding the notification; and based at least in part on the user input, blocking or allowing communication with the unverified entity via the secure channel.

Example N, the method of any of examples I-M, wherein selecting a classifier based at least in part on one or more properties of the certificate comprises: determining an issuer of the certificate; and selecting a classifier to employ based at least in part on the issuer of the certificate.

Example O, the method of any of examples I-N, wherein selecting a classifier based at least in part on one or more properties of the certificate comprises: determining how the certificate is to be used; and selecting a classifier to employ based at least in part on the determination of how the certificate is to be used.

Example P, a computing device comprising: one or more processors; memory communicatively coupled to the one or more processors; a training module stored in the memory and executable by the one or more processors to: access a plurality of certificates stored in a data store; and employ one or more machine-learning algorithms to: identify one or more characteristics of the plurality of certificates, the one or more characteristics indicating a type or an issuer of each of the plurality of certificates; and train one or more certificate classifiers, the training being based at least in part on the type or the issuer of the plurality of certificates; and a communication component communicatively coupled to the one or more processors and configured to output the one or more certificate classifiers to be implemented on a client device.

Example Q, the computing device of example P, wherein the one or more certificate classifiers are trained to determine whether a valid certificate is being used improperly.

Example R, the computing device of any of examples P or Q, wherein the communication component is further configured to receive the plurality of certificates by receiving telemetry data from client devices.

Example S, the computing device of examples P-Q, wherein the training module is configured to employ the one or more machine-learning algorithms to train one or more certificate classifiers by: identifying a behavior of a certificate issuer based at least in part on a plurality of certificates for the certificate issuer and training one or more issuer-specific classifiers based at least in part on the identified behavior; and identifying a characteristic of a plurality of certificates having a same certificate purpose and training one or more purpose-specific classifiers based at least in part on the identified characteristic.

Example T, the computing device of any of examples P-S, wherein: the communication component is executable by the one or more processors to receive new certificates; the training module is executable by the one or more processors to update the one or more certificate classifiers by employing the one or more machine-learning algorithms based at least in part on the new certificates; and the communication component is further configured to output the one or more updated certificate classifiers to the client device via the communication component.

Example U, one or more computer-readable storage media storing instructions that, when executed, instruct one or more processors to perform operations including the method of any of examples I-O.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device comprising:
one or more processors;
a display communicatively coupled to the one or more processors and configured to display content;
memory communicatively coupled to the one or more processors;
a communication module stored in the memory and executable by the one or more processors to:
receive, from a trusted entity, one or more classifiers, the one or more classifiers are previously trained by the trusted entity and used to determine a probability that a received certificate by the computing device is being used improperly;
receive, from an unverified entity, a request to perform an operation with the unverified entity, the operation relating to communication with the unverified entity over a secure channel; and
receive, from the unverified entity, a certificate associated with the unverified entity;
a selection module stored in the memory and executable by the one or more processors to determine which of the one or more classifiers to employ based at least in part on one or more characteristics of the certificate; and
the one or more classifiers executable by the one or more processors to:
determine that the certificate is valid and determine a probability that the certificate is being used improperly;
cause the certificate to be stored in the memory based at least in part on a sampling percentage associated with the probability that the valid certificate is being used improperly;
determine an action to be performed based at least in part on the probability that the certificate is being used improperly; and
cause the stored certificate to be sent to the trusted entity to update classifier training data,
wherein the communication module stored in the memory and executable by the one or more processors to further:
send, to the trusted entity, the stored certificate to update classifier training data; and
receive, from the trusted entity, one or more updated classifiers, the one or more updated classifiers are trained by the trusted entity with the updated classifier training data and used to determine the probability that the received certificate by the computing device is being used improperly.

2. The computing device of claim 1, wherein the selection module is configured to determine one or more classifiers to employ by:
selecting a single classifier; or
selecting multiple classifiers to be used as a multi-stage classifier.

3. The computing device of claim 1, wherein the selection module is configured to determine one or more classifiers to employ by:
determining an issuer of the certificate; and
selecting a classifier to employ based at least in part on the issuer of the certificate.

4. The computing device of claim 1, wherein the selection module is configured to determine one or more classifiers to employ by:
  determining a type of the certificate; and
  selecting a classifier to employ based at least in part on the type of the certificate.

5. The computing device of claim 1, wherein the one or more characteristics of the certificate comprise one or more of:
  a period of time during which the certificate is valid;
  a location of a service used to query whether the certificate has been revoked by a certificate authority;
  a time that the certificate was issued;
  the certificate authority that issued the certificate;
  a geographic location where the certificate was issued and a geographic location of the certificate authority for the certificate;
  a purpose of the certificate; or
  a particular combination of purposes of the certificate.

6. The computing device of claim 1, wherein the one or more classifiers are configured to determine the probability that the certificate is being used improperly by:
  analyzing the one or more characteristics of the certificate using an algorithm of the one or more classifiers;
  identifying, based at least in part on the analyzing, one or more differences between the one or more characteristics of the certificate and learned characteristics of other certificates used to create the algorithm of the one or more classifiers; and
  determining, based at least in part on the one or more identified differences, the probability that the certificate is being used improperly.

7. The computing device of claim 1, wherein the one or more classifiers are configured to cause the certificate to be stored by:
  determining that the probability is less than a threshold;
  based at least in part on determining that the probability is less than the threshold, causing the certificate to be stored in the memory according to a sampling percentage that is less than a predetermined sampling percentage.

8. The computing device of claim 1, wherein the one or more classifiers are configured to cause the certificate to be stored by:
  determining that the probability is more than a threshold;
  based at least in part on determining that the probability is more than the threshold, causing the certificate to be stored according to a sampling percentage that is more than a predetermined sampling percentage.

9. A method comprising:
  receiving, by a computing device and from a trusted entity, one or more classifiers, the one or more classifiers are previously trained by the trusted entity and used to determine a probability that a received certificate by the computing device is being used improperly;
  receiving, by the computing device and from an unverified entity, a request to communicate via a secure channel;
  receiving a certificate from the unverified entity;
  selecting a classifier of the received one or more classifiers based at least in part on one or more properties of the certificate;
  using the classifier to:
    determine that the certificate is valid;
    determine a probability that the certificate is being used improperly;
    stored the certificate based at least in part on a sampling percentage associated with the probability that the valid certificate is being used improperly; and
    determining an action based at least in part on the probability that the certificate is being used improperly, the action relating to communication with the unverified entity via the secure channel;
  performing the action;
  send, to the trusted entity, the stored certificate to update classifier training data; and
  receive, from the trusted entity, one or more updated classifiers, the one or more updated classifiers are trained by the trusted entity with the updated classifier training data and used to determine the probability that the received certificate by the computing device is being used improperly.

10. The method of claim 9, wherein determining an action based at least in part on the probability that the certificate is being used improperly comprises:
  determining that the probability that the certificate is being used improperly is greater than a threshold; and
  determining to block communication with the unverified entity via the secure channel.

11. The method of claim 9, wherein determining an action based at least in part on the probability that the certificate is being used improperly comprises:
  determining that the probability that the certificate is being used improperly is less than a threshold; and
  determining to allow communication with the unverified entity via the secure channel.

12. The method of claim 9, wherein determining an action based at least in part on the probability that the certificate is being used improperly comprises:
  determining that the probability is less than a first threshold and greater than a second threshold; and
  determining to present a notification that the certificate is potentially being used improperly.

13. The method of claim 12, wherein performing the action comprises presenting the notification that the certificate is potentially being used improperly, and the method further comprises:
  receiving user input regarding the notification; and
  based at least in part on the user input, blocking or allowing communication with the unverified entity via the secure channel.

14. The method of claim 9, wherein selecting a classifier based at least in part on one or more properties of the certificate comprises:
  determining an issuer of the certificate; and
  selecting a classifier to employ based at least in part on the issuer of the certificate.

15. The method of claim 9, wherein selecting a classifier based at least in part on one or more properties of the certificate comprises:
  determining how the certificate is to be used; and
  selecting a classifier to employ based at least in part on the determination of how the certificate is to be used.

16. One or more non-transitory computer storage media that store computer-executable instructions, when executed by one or more processors, configure a computing device to perform the operations comprising:
  receiving, from a trusted entity, one or more classifiers, the one or more classifiers are previously trained by the trusted entity and used to determine a probability that a received certificate by the computing device is being used improperly;

receiving, from an unverified entity, a request to communicate via a secure channel;

receiving a certificate from the unverified entity;

selecting a classifier of the received one or more classifiers based at least in part on one or more properties of the certificate;

using the classifier to:
- determine that the certificate is valid;
- determine a probability that the certificate is being used improperly;
- stored the certificate based at least in part on a sampling percentage associated with the probability that the valid certificate is being used improperly; and
- determining an action based at least in part on the probability that the certificate is being used improperly, the action relating to communication with the unverified entity via the secure channel;

performing the action;

send, to the trusted entity, the stored certificate to update classifier training data; and receive, from the trusted entity, one or more updated classifiers, the one or more updated classifiers are trained by the trusted entity with the updated classifier training data and used to determine the probability that the received certificate by the computing device is being used improperly.

17. The one or more non-transitory computer storage media of claim 16, wherein determining an action based at least in part on the probability that the certificate is being used improperly comprises:

determining that the probability that the certificate is being used improperly is greater than a threshold; and determining to block communication with the unverified entity via the secure channel.

18. The one or more non-transitory computer storage media of claim 16, wherein determining an action based at least in part on the probability that the certificate is being used improperly comprises:

determining that the probability that the certificate is being used improperly is less than a threshold; and determining to allow communication with the unverified entity via the secure channel.

19. The one or more non-transitory computer storage media of claim 16, wherein determining an action based at least in part on the probability that the certificate is being used improperly comprises:

determining that the probability is less than a first threshold and greater than a second threshold; and determining to present a notification that the certificate is potentially being used improperly.

20. The one or more non-transitory computer storage media of claim 19, wherein performing the action comprises presenting the notification that the certificate is potentially being used improperly, and wherein the computing device is further configured to perform the operations comprising:

receiving user input regarding the notification; and based at least in part on the user input, blocking or allowing communication with the unverified entity via the secure channel.

* * * * *